US006855761B2

(12) United States Patent
Muranaka et al.

(10) Patent No.: US 6,855,761 B2
(45) Date of Patent: Feb. 15, 2005

(54) MONODISPERSE PARTICLES, PROCESS FOR PRODUCING THE SAME, AND USES THEREOF

(75) Inventors: Kazuaki Muranaka, Shinnanyo (JP); Teruhiko Tsuda, Shinnanyo (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 09/553,948

(22) Filed: Apr. 21, 2000

(65) Prior Publication Data

US 2002/0072565 A1 Jun. 13, 2002

(30) Foreign Application Priority Data

Apr. 23, 1999 (JP) .......................................... 11-116237

(51) Int. Cl.[7] .......................... C08F 2/22; C08L 33/08; C08L 33/10
(52) U.S. Cl. ........................ 524/460; 524/560; 524/832
(58) Field of Search ........................ 523/201; 524/460, 524/501, 504, 523, 548, 560; 525/80

(56) References Cited

U.S. PATENT DOCUMENTS

| 3,725,367 A | | 4/1973 | Kemp | |
|---|---|---|---|---|
| 3,875,130 A | | 4/1975 | Kemp | |
| 4,226,752 A | * | 10/1980 | Erickson et al. ............ | 524/460 |
| 4,247,434 A | | 1/1981 | Vanderhoff et al. | |
| 4,336,173 A | | 6/1982 | Ugelstad | |
| 4,914,142 A | * | 4/1990 | Takarabe et al. ............ | 523/511 |
| 4,952,651 A | * | 8/1990 | Kasai et al. ................ | 526/201 |
| 5,189,107 A | * | 2/1993 | Kasai et al. ................ | 525/244 |
| 5,216,096 A | * | 6/1993 | Hattori et al. .............. | 526/201 |
| 5,266,646 A | * | 11/1993 | Eisenhart et al. ........... | 525/301 |
| 5,455,315 A | * | 10/1995 | Paine et al. ................. | 526/79 |
| 5,496,897 A | | 3/1996 | Yoshimatsu et al. | |
| 5,756,573 A | * | 5/1998 | Trumbo et al. ............. | 524/458 |
| 5,928,830 A | * | 7/1999 | Chang et al. ............... | 430/137 |
| 6,020,435 A | * | 2/2000 | Blankenship et al. ....... | 525/256 |

FOREIGN PATENT DOCUMENTS

| EP | 0326383 A2 | 8/1989 |
|---|---|---|
| EP | 0338486 A2 | 10/1989 |
| EP | 0507634 A1 | 10/1992 |
| EP | 0575143 A2 | 12/1993 |
| JP | 09302004 | 11/1997 |

* cited by examiner

Primary Examiner—Callie Shosho
(74) Attorney, Agent, or Firm—Nixon & Vanderhye P.C.

(57) ABSTRACT

Monodisperse particles having a particle diameter in the range of about from 1 to 1,000 μm; a process for easily producing the particles; a column for liquid chromatography which is packed with the particles; and a method of liquid chromatography which comprises using the column. The monodisperse particles are obtained by adding an aqueous emulsion containing a polymerizable monomer to monodisperse polymer seed particles comprising a poly((meth) acrylic ester) containing at least one kind of groups selected from the group consisting of straight-chain alkyl groups having 6 or more carbon atoms, alicyclic alkyl groups having 6 or more carbon atoms, phenyl groups, benzyl groups and halogenated alkyl groups having 3 or more carbon atoms to thereby swell the seed particles and then polymerizing the polymerizable monomer.

4 Claims, 4 Drawing Sheets

MONODISPERSE PARTICLES, PROCESS FOR PRODUCING THE SAME, AND USES THEREOF

FIELD OF THE INVENTION

The present invention relates to monodisperse particles having a particle diameter in the range of about from 1 to 1,000 μm and a process for producing the particles.

DESCRIPTION OF THE RELATED ART

Widely known techniques for producing monodisperse particles having a particle diameter of from several micrometers to hundreds of micrometers include seed polymerization method which is one form of emulsion polymerization, two-stage swelling seed polymerization method and membrane emulsification method. In the emulsion polymerization, monodisperse particles can be synthesized by using monodisperse seed particles of from 2 to 40 μm and repeatedly subjecting the seed particles of from 2 to 40 μm to swelling and emulsion polymerization while regulating the concentration of an emulsifying agent during the polymerization, as described, e.g., in U.S. Pat. No. 4,247,434. However, this method has a problem concerning suitability for practical use because the degree of swelling attainable by one swelling operation is about several times at the most and, hence, production of particles having a large particle diameter necessitates repetitions of the operation tens of times, and because it is necessary to conduct the polymerization under zero-gravity conditions, as in the outer space, in order to inhibit aggregation. Another problem is that the actually producible particles are limited to considerably weak particles having a degree of crosslinking of 1% or lower because increasing the degree of crosslinking of particles results in the generation of particles of irregular shapes and the generation of new particles.

U.S. Pat. No. 4,336,173 describes the two-stage swelling seed polymerization method. This method utilizes a phenomenon in which an emulsion of an oil-soluble substance prepared by mixing the oil-soluble substance with a slight amount of a highly hydrophobic organic compound and then emulsifying the mixture has markedly enhanced stability. This method comprises preparing monodisperse droplets of a highly hydrophobic substance, causing the droplets to absorb a monomer, and forming monodisperse particles from the monomer-containing droplets.

However, this method has a disadvantage that the formation of monodisperse droplets of a highly hydrophobic monomeric substance necessitates the following complicated procedure. First, a monodisperse aqueous polystyrene dispersion is prepared. Acetone is added to the aqueous phase in the dispersion to increase the organic solvent concentration of the aqueous phase and thereby facilitate absorption of a highly hydrophobic substance. Thereafter, an emulsion of the highly hydrophobic substance is added to the dispersion and the acetone concentration of the aqueous phase is then lowered.

There is a description in this reference to the effect that particles having any desired degree of crosslinking can be produced by this method and it is possible to attain a higher degree of swelling than in the case where monodisperse polystyrene particles are merely swollen directly with a monomer. However, with respect to the degree of swelling, the attainable degree of swelling based on the droplets containing a highly hydrophobic substance absorbed therein is about 50 times at the most, although that based on the starting polystyrene particles is about 150 times. This fact shows that the degree of swelling actually attainable by this method is not so high. Further, a step of absorbing a highly hydrophobic substance in the monodisperse polystyrene is needed. This requires to add acetone or the like to a mixture of an emulsion of the highly hydrophobic substance and a monodisperse polystyrene dispersion in order to absorb the highly hydrophobic substance which is inherently difficult to be absorbed, and the mixed system tends to be unstable. For this reason, close attention must be paid to maintain this step. Thus, a multi-stage step has been needed in the course of from synthesis of seed particles to swelling thereof. There also is a possibility that the highly hydrophobic substance used might adversely influence the formation of pores in the particles being yielded. It is widely known that in the case where polystyrene seed particles are used to conduct seed polymerization, the particles obtained have pores resulting from the phase separation of the seed particles, not only when the monomer used is an acrylic monomer having poor compatibility with polystyrene but also when it is styrene, which is the monomer of polystyrene.

In the one-stage swelling seed polymerization method in which monodisperse polymer particles as seeds are directly swollen by causing the particles to absorb a monomer, a high degree of swelling can be attained by regulating the droplet diameter of a monomer emulsion and regulating the time period for swelling, as described, e.g., in JP-A-62-12701. (The term "JP-A" as used herein means an "unexamined published Japanese patent application".)

However, this method has the following disadvantages. Although the droplet diameter of a monomer emulsion should be regulated so as to be suitable for the diameter of the seed particles, this regulation is extremely difficult in actual production. Furthermore, the necessity of regulating the swelling time means that there is an optimal range of swelling time, but the presence thereof is undesirable from the standpoint of production.

U.S. Pat. No. 5,496,897 describes a method which comprises adding a hydrophilic organic compound to a polymerizable monomer, emulsifying the mixture in water, and then causing polymer seed particles to absorb the monomer. This method can attain a degree of swelling of from 50 to 60 times by using the monomer in combination with about 10% hydrophilic organic compound. However, there is a possibility that the hydrophilic organic compound used might adversely influence the formation of pores in the particles being yielded.

The membrane emulsification method is a technique in which droplets uniform in diameter are formed in an emulsifier-containing aqueous medium through an SPG membrane (shirasu porous glass membrane) having uniform pores, as described, e.g., in *Journal of Applied Polymer Science*, Vol. 51, 1–11 (1994). In this method, a polymerizable monomer is directly converted to uniform droplets and polymerized, whereby relatively monodisperse particles can be synthesized. This method is applicable also to seed polymerization in which monodisperse droplets of a highly hydrophobic organic compound are formed and a polymerizable monomer is polymerized after having been absorbed in the droplets.

In this method, monodisperse particles having a diameter about 5 times the pore diameter of the membrane can be synthesized when a highly hydrophobic monomer, such as styrene monomer, is used. However, there is a problem that when a relatively hydrophilic monomer is used, it is difficult to form monodisperse droplets because the monomer spreads on the membrane surface due to the high hydrophilicity of the membrane. Furthermore, the method has the following problem when it is used in forming monodisperse droplets of a highly hydrophobic organic compound and producing particles therefrom by seed polymerization. Since the formable monodisperse droplets of a highly hydrophobic organic compound are limited to relatively large droplets having a diameter of several micrometers, production of particles not larger than 10 μm results in a reduced degree of swelling, i.e., an increased proportion of the highly hydrophobic organic compound to the monomer, and this adversely influences pore formation.

SUMMARY OF THE INVENTION

The present invention has been made to overcome the above-described problems in the prior art.

Accordingly, one object of the present invention is to provide monodisperse particles having a particle diameter in the range of about from 1 to 1,000 μm.

Another object of the present invention is to provide a process for easily producing the particles.

Still another object of the present invention is to provide a column for liquid chromatography which is packed with the particles.

Further object of the present invention is to provide a method of liquid chromatography which comprises using the column.

The monodisperse particles according to the present invention are obtained by adding an aqueous emulsion containing a polymerizable monomer to monodisperse polymer seed particles comprising a poly((meth)acrylic ester) containing at least one kind of groups selected from the group consisting of straight-chain alkyl groups having 6 or more carbon atoms, alicyclic alkyl groups having 6 or more carbon atoms, phenyl group, benzyl group and halogenated alkyl groups having 3 or more carbon atoms to thereby swell the seed particles and then polymerizing the polymerizable monomer.

The process for producing monodisperse particles according to the present invention comprises adding an aqueous emulsion containing a polymerizable monomer to monodisperse polymer seed particles comprising a poly((meth)acrylic ester) containing at least one kind of groups selected from the group consisting of straight-chain alkyl groups having 6 or more carbon atoms, alicyclic alkyl groups having 6 or more carbon atoms, phenyl groups, benzyl groups and halogenated alkyl groups having 3 or more carbon atoms to thereby swell the seed particles and then polymerizing the polymerizable monomer.

The column for liquid chromatography according to the present invention is packed with the monodisperse particles.

The method of liquid chromatography according to the present invention comprises using the column.

DETAILED DESCRIPTION OF THE INVENTION

The present invention is described in detail below.

The steps in the process for producing the monodisperse particles according to the present invention are described in the order thereof below.

The first stage is a step of preparing monodisperse seed particles. The method of preparing the seed particles can use emulsion polymerization method and dispersion polymerization.

The second stage is a step of swelling and polymerizing the seed particles. In this step, swelling proceeds by mixing the seed particle dispersion and a monomer emulsion in optional proportion. Use of the seed particles of the present invention differs from the conventional two-stage swelling method and does not need to mix highly hydrophobic substance with the seed particle dispersion, adding a swelling assistant such as acetone thereto and prepare droplets of the highly hydrophobic substance, and can achieve high degree of swelling. Further, as a method of preventing expansion of particle size distribution by coalescence or scission of droplets, a method of adding a water-soluble high molecular weight compound such as polyvinyl alcohol has conventionally been known in order to stabilize the droplets. However, it is conventional that such an addition hinders swelling of the seed particles by the monomer. For this reason, the addition of the water-soluble high molecular weight compound generally has conventionally conducted aster completion of the swelling step. However, use of the seed particles of the present invention makes it possible to add the water-soluble high molecular weight compound and also to prevent expansion of the molecular weight distribution in the swelling step. The polymerization step is the same as in the conventional one, and it is possible to easily proceed the polymerization.

Thus, according to the present invention, the swelling step can easily be conducted as compared with the conventional method.

Optionally, the step of washing polymer particles is added. In this optional step, for example, the seed particle polymer is taken out from the polymer particles. The polymer can easily be removed from the polymer particles in any of various solvents such as ketone solvents, acetate solvents or aromatic solvents so long as washing is conducted.

The (meth)acrylic ester polymer seed particles for use in the present invention are particles of a polymer in which the ester moieties have one or more kinds of groups selected from straight-chain alkyl groups having 6 or more carbon atoms, alicyclicalkyl groups having 6 or more carbon atoms, phenyl groups, benzyl groups and halogenated alkyl groups having 3 or more carbon atoms. Examples of such esters include n-hexyl (meth)acrylate, 2-ethylhexyl (meth)acrylate, stearyl (meth)acrylate, n-octyl (meth)acrylate, t-butylcyclohexyl (meth)acrylate, cyclohexyl (meth)acrylate, 2,3-dibromopropyl (meth)acrylate, 1H, 1H, 2H, 2H-heptafluoro-n-decyl (meth)acrylate, 1,1,1,3,3,3-hexafluoroisopropyl (meth)acrylate, phenyl (meth)acrylate, 4-methylphenyl (meth)acrylate, 2-methylphenyl (meth)acrylate, 3-methylphenyl (meth)acrylate and benzyl (meth)acrylate. It is especially preferred to use polymer particles having straight-chain alkyl groups, alicyclic alkyl groups or benzyl groups because a wide range of polymerizable monomers can be used in the later-stage polymerization without being influenced by the phase separation of the seed particles and monodisperse particles having a satisfactory surface share can be obtained. On the other hand, in the case where the degree of swelling is important, it is preferred to use a straight-chain alkyl ester. In the case where the stable production and storage stability of seed particles are important, it is preferred to use an alicyclic ester or benzyl ester.

The seed particles to be used are not particularly limited in molecular weight. However, it is preferred to use seed particles having a weight average molecular weight of 50,000 or lower because such seed particles can be swollen to a high degree in the later step in which an organic compound mixture containing a polymerizable monomer is absorbed therein.

The seed particles can be synthesized by conventional dispersion polymerization in an organic solvent or conventional emulsion polymerization in an aqueous medium. However, since the production of seed particles by suspension polymerization frequently necessitates conversion of the resultant seed particle dispersion to an aqueous dispersion, emulsion polymerization is preferably used for seed particle production.

In the case of emulsion polymerization, it is preferred to conduct soap-free emulsion polymerization using a chain transfer agent from the standpoint of producing seed particles having satisfactory reproducibility with respect to molecular weight, average particle diameter, and the degree of particle size dispersion. General chain transfer agents can be used as the chain transfer agent. Examples thereof include straight-chain or alicyclic alkyl thiols such as 1,1,3,3-tetramethylbutane-1-thiol, cyclohexyl mercaptan, t-tetradecanethiol, octadecyl mercaptan, 1-pentanethiol, 1-hexadecanethiol, 2-methyl-2-propanethiol, 2-propenethiol, 1-pentanethiol, 1-dodecanethiol, 1-octanethiol, 1-hexanethiol, and 1-butanethiol, aromatic thiols such as naphthalenethiol, pentafluorothiophenol, 2-methoxybenzenethiol, 4-methoxybenzenethiol, 2-chlorothiophenol, o-bromothiophenol, 2-isopropylthiophenol, 1,3-benzenethiol, thiophenol, m-thiocresol and thioxcylenol; thioglycolic esters such as methyl thioglycolate, ethyl thioglycolate and 2-ethylhexyl thioglycolate; 3-mercaptopropionic esters; and thiosalicylic esters. Preferred of these are the thioglycolic esters having 8 or less carbon atoms in the ester moiety. In the case where a chain transfer agent having an anion exchange group in the molecule is used, care should be taken because this chain transfer agent may cause aggregation during emulsion polymerization. Furthermore, use of a chain transfer agent having two or more thiol groups in the molecule is undesirable because the seed particles obtained with this chain transfer agent have a reduced molecular weight.

The seed particles synthesized by emulsion polymerization or another method can be subjected as they are to the subsequent step without the necessity of especially conducting purification or the like. Monodisperse particles obtained by the present invention can be used as seed particles to obtain monodisperse particles having a larger particle diameter.

Further, it is possible to use seed particles produced by the conventional two-stage swelling polymerization method and absorb the highly hydrophobic substance in such seed particles. In this case, the swelling proceeds without adding a swelling assistant, such as acetone, which is added to a mixture of the highly hydrophobic substance emulsion and the seed particle dispersion in order to absorb the highly hydrophobic substance in the seed particles, and it is possible to produce monodisperse droplets of the highly hydrophobic substance having uniform particle size.

The aqueous emulsion containing a polymerizable monomer comprises the polymerizable monomer, a polymerization initiator, an emulsifying agent and water. A pore-forming agent for forming pores in particles may be added thereto according to need. For emulsification, a general method can be employed, such as one using a homogenizer or the like.

The polymerizable monomer is not particularly limited and any polymerizable monomer can be used as long as its solubility in water is 0.001% by weight or higher. A non-crosslinkable monomer and a crosslinkable monomer can be used in any desired proportion. Examples of the polymerizable monomer include styrene; styrene derivatives such as 4-methylstyrene, divinylbenzene and chloromethylstyrene; (meth)acrylic esters such as methyl (meth)acrylate, butyl (meth)acrylate, hexyl (meth)acrylate, 2-hydroxyethyl (meth)acrylate and glycidyl (meth)acrylate; (meth)acrylamides; acrylonitrile; maleic esters; maleamides; maleimides; vinyl chloride, vinyl acetate; triallyl isocyanurate; and butadiene. However, it is especially preferred to use a nonionic or anionic monomer because use of a cationic monomer having high solubility in water may aggregate the seed particles.

The pore-forming agent optionally used for forming pores used can be an organic substance employed as a pore-forming agent for particles in general suspension polymerization. Examples thereof include aromatic compounds such as toluene, xylene, benzyl alcohol, phthalic esters and benzoic esters; acetic esters; acetamides; higher alcohols such as butanol, pentanol and hexanol; and halogenated compounds such as ethylene dichloride, 1,3-dichloropropane, chlorobenzenes and chloroform. Although the amount of these pore-forming agents used is not particularly limited, it is generally about from 0 to 200 parts by weight per 100 parts by weight of the monomer from the standpoint of the strength of the particles formed.

The polymerization initiator is preferably an oil-soluble polymerization initiator. Examples thereof include azo initiators such as azoisobutyrovaleronitrile and 2,2'-azobis(2,4-dimethylvaleronitrile), and organic peroxides such as benzoyl peroxide and t-butyl peroxy-2-ethylhexanoate.

The mixing ratio among the polymerizable monomer, the pore-forming agent which can be optionally added, and the polymerization initiator is not particularly limited, and these ingredients can be used in any desired proportion according to purposes.

The emulsifying agent is preferably a nonionic or anionic emulsifying agent. Examples thereof include polyethylene glycol derivatives such as polyethylene glycol lauryl ether and polyethylene glycol dodecyl ether, alkyl sulfonic acid salts, alkylbenzenesulfonic acid salts, alkylphosphoric acid salts and alkylcarboxylic acid salts. The amount of these emulsifying agents used is not particularly limited as long as the emulsion prepared can retain sufficient stability. In emulsifying an organic mixture of the ingredients described above including a polymerizable monomer to prepare an aqueous emulsion, it is preferred to use water in at least the same amount by volume as the organic mixture.

In the case where monodisperse particles obtained by the invention are used as seed particles for obtaining particles having a larger diameter as described above, it is preferred to add a chain transfer agent to the aqueous emulsion. Examples of methods for this addition include a method in which the chain transfer agent is mixed with a polymerizable monomer or other ingredients in preparing the aqueous emulsion and a method in which an emulsion of the chain transfer agent alone is prepared and mixed with the seed particles to cause the particles to absorb the chain transfer agent before the seed particles are swollen with a monomer. The chain transfer agent used in these methods may be a general oil-soluble chain transfer agent. The amount thereof used is not particularly limited, and the chain transfer agent may be added in a necessary amount suitable for attaining the desired molecular weight.

The amount of the polymerizable monomer and the pore-forming agent is preferably from 10 to 50,000 times by volume the volume of the polymer seed particles.

In the step of adding the aqueous emulsion containing a polymerizable monomer to the polymer seed particles to swell the polymer seed particles, a polymeric dispersion stabilizer can be used according to need for stabilizing droplets. The time when a polymeric dispersion stabilizer is added is not particularly limited. For example, the following method may be used; a method in which a polymeric dispersion stabilizer is added to a polymer seed particle dispersion before an aqueous emulsion containing a polymerizable monomer is added thereto or a method in which an aqueous emulsion containing a polymerizable monomer is added to a polymer seed particle dispersion before a polymeric dispersion stabilizer is added thereto. The polymeric dispersion stabilizer is not particularly limited as long as it is a nonionic or anionic, polymeric dispersion stabilizer. Examples thereof include poly(vinyl alcohol), polyvinylpyrrolidone, hydroxypropyl cellulose, carboxymethyl cellulose, dextran and (meth)acrylic acid salt copolymers. With respect to addition amount, it is sufficient to add the polymeric dispersion stabilizer in an amount necessary for maintaining the dispersed state of the particles during polymerization. In general, a dispersion stabilizer concentration in water of from 0.5 to 4% by weight is sufficient.

A water-soluble polymerization inhibitor can be added in the invention for the purpose of inhibiting the progress of emulsion polymerization in the aqueous phase. Examples thereof include sodium nitrite, copper chloride, hydroxyethylamine and compounds having an aromatic secondary amine structure.

Polymerization is conducted after components of the aqueous emulsion, i.e., the organic mixture containing a polymerizable monomer, have been absorbed in the polymer seed particles as described above. The polymerization may be conducted in an ordinary manner at a polymerization temperature suitable for the polymerization initiator while conducting replacement with nitrogen according to need.

In the case where a polymeric dispersion stabilizer, for example, was used, the particles obtained through the polymerization are preferably washed with warm water in order to remove the stabilizer. In the case where it is necessary to remove the seed particle polymer according to applications of the particles, this removal is preferably accomplished by washing with a solvent such as acetone.

The present invention is described in more detail by reference to the following Examples, but the invention should not be construed as being limited thereto.

EXAMPLE 1

A 300 ml three-necked flask was attached to an oil bath. To the flask were introduced 30 g of cyclohexyl methacrylate (special-grade reagent) and 0.6 ml of ethylhexyl thioglycolate. After the contents were stirred sufficiently, 200 ml of ion-exchanged water was introduced into the three-necked flask. A condenser tube and a thermometer were attached to the flask. The atmosphere in the three-necked flask was replaced with nitrogen and the oil bath temperature was set at 70° C. to heat the flask. After 1 hour, a solution prepared by dissolving 0.6 g of potassium persulfate in 20 ml of ion-exchanged water was introduced into the three-necked flask. Polymerization was continued for 20 hours while keeping the bath temperature at 70° C. After completion of the polymerization, aggregates were removed with a 200 $\mu$m aperture size sieve. The average particle diameter of the cyclohexyl methacrylate polymer particles obtained was measured with a laser scattering type particle size distribution analyzer (manufactured by Horiba Ltd.). As a result, the polymer particles were found to be monodisperse particles having a volume-average particle diameter of 0.65 $\mu$m and a CV of 4.5%. The average molecular weight thereof was determined by gel permeation chromatography and was found to be 17,000. The polymer particle dispersion had a solid concentration of 11.6%.

Figure 1:
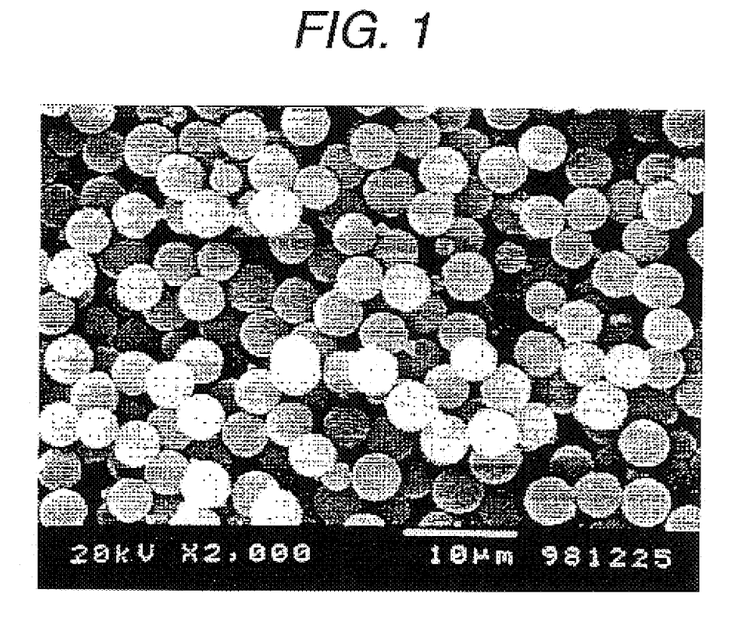
FIG. 1 is an electron photomicrograph showing the particle structure of the particles produced in Example 1.

A 500 ml three-necked flask was attached to an oil bath. Thereinto was introduced 1.71 g (solid amount, 0.2 g) of the seed particle dispersion obtained above, followed by 30 g of an 8% aqueous solution of poly(vinyl alcohol) (Kuraray 224). The contents were stirred at room temperature. On the other hand, 15 g of styrene (special-grade reagent), 10 g of divinylbenzene (reagent, 55% divinylbenzene), 25 g of toluene (special grade reagent), and 0.3 g of 2,2'-azobis(2, 4-dimethylvaleronitrile) (hereinafter referred to as "V-65" (manufactured by Wako Pure Chemical Industries, Ltd.)) were introduced into a 500 ml flask and mixed together. Thereto was added 0.5 g of sodium dodecylbenzenesulfonate (reagent), followed by 200 ml of ion-exchanged water. Subsequently, the mixture was emulsified with an ultrasonic homogenizer (manufactured by BRANSON Corp.) This emulsion was added to the seed particle dispersion and the resultant mixture was slowly stirred at room temperature. After 6 hours, an examination with an optical microscope revealed that the monomer emulsion had been completely absorbed by the seed particles and uniform droplets had generated. To this solution was added 0.3 g of cupric chloride (reagent). The bath temperature was set at 70° C. and polymerization was conducted in a nitrogen stream. After the polymerization was conducted for 3 hours, the conversions of the styrene and divinylbenzene into polymer were determined by reversed-phase liquid chromatography and were found to be 95% and 98%, respectively. The particles obtained were washed with warm water and acetone and then examined with an electron microscope. As a result, the particles were found to be monodisperse particles having a number-average particle diameter of 4.0 $\mu$m and a CV of 9.8%, and pores or the like attributable to seed particle phase separation was not observed on the particles. An electron photomicrograph of these particles is shown in FIG. 1.

EXAMPLE 2

Figure 2:
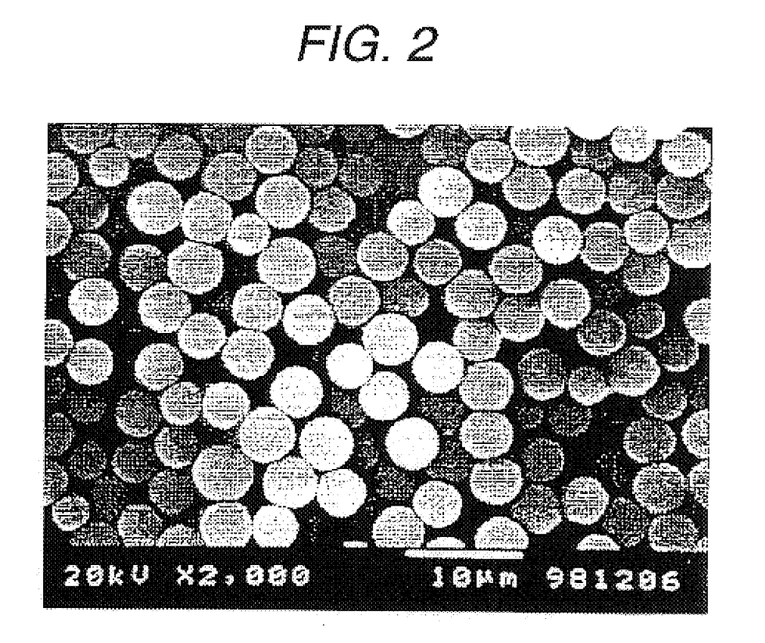
FIG. 2 is an electron photomicrograph showing the particle structure of the particles produced in Example 2.

Synthesis was conducted in the same manner as in Example 1, except that the polymerizable monomers were replaced with 37.5 g of glycidyl methacrylate and 12.5 g of ethylene glycol dimethacrylate and that the polymerization thereof was conducted without using a pore-forming agent and without adding cupric chloride. The particles obtained were monodisperse particles having a number average particle diameter of 4.2 μm and a CV of 11.2%, and pores or the like attributable to seed particle phase separation was not observed thereon. An electron photomicrograph of these particles is shown in FIG. 2.

EXAMPLE 3

A 300 ml three-necked flask was attached to an oil bath. To the flask were introduced 30 g of n-hexyl methacrylate (special grade reagent) and 0.6 ml of ethylhexyl thioglycolate. After the contents were stirred sufficiently, 200 ml of ion-exchanged water was introduced into the three-necked flask. A condenser tube and a thermometer were attached to the flask. The atmosphere in the three-necked flask was replaced with nitrogen and the oil bath temperature was set at 70° C. to heat the flask. After 1 hour, a solution prepared by dissolving 0.6 g of potassium persulfate in 20 ml of ion-exchanged water was introduced into the three-necked flask. Polymerization was continued for 20 hours while keeping the bath temperature at 70° C. After completion of the polymerization, aggregates were removed with a mesh sieve of 200 μm. The average particle diameter of the n-hexyl methacrylate polymer particles obtained was measured with a laser scattering type particle size distribution analyzer (manufactured by Horiba Ltd.). As a result, the polymer particles were found to be monodisperse particles having a volume-average particle diameter of 1.0 μm and a CV of 4.6%. The average molecular weight thereof was determined by gel permeation chromatography and was found to be 39,000. The polymer particle dispersion had a solid concentration of 5.9%.

Figure 3:
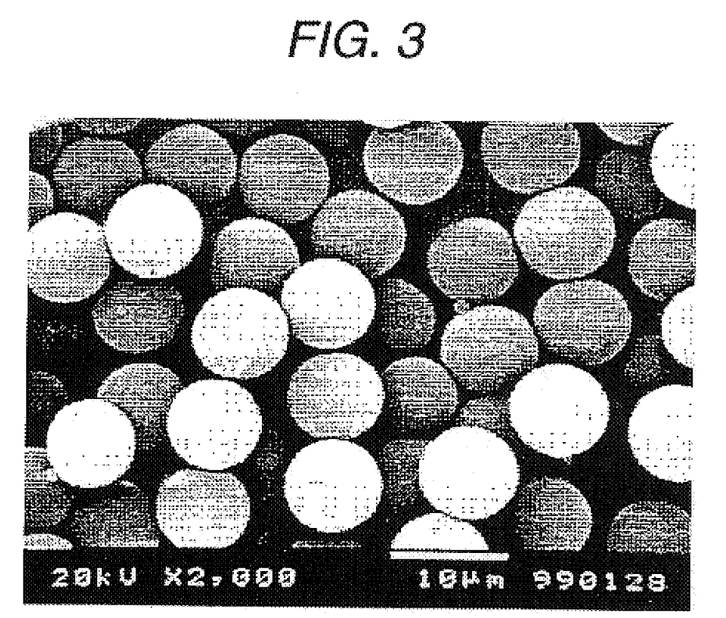
FIG. 3 is an electron photomicrograph showing the particle structure of the particles produced in Example 3.

The subsequent synthesis was conducted in the same manner as in Example 1, except that the seed particle dispersion obtained above was used in an amount of 1.69 g (solid amount, 0.1 g) The particles obtained were monodisperse particles having a number average particle diameter of 8.1 μm and a CV of 5.6%, and pores or the like attributable to seed particle phase separation was not observed thereon. An electron photomicrograph of these particles is shown in FIG. 3.

EXAMPLE 4

A 300 ml three-necked flask was attached to an oil bath. To the flask were introduced 30 g of 2-ethylhexyl methacrylate (special grade reagent) and 0.6 ml of ethylhexyl thioglycolate. After the contents were stirred sufficiently, 200 ml of ion-exchanged water was introduced into the three-necked flask. A condenser tube and a thermometer were attached to the flask. The atmosphere in the three-necked flask was replaced with nitrogen and the oil bath temperature was set at 70° C. to heat the flask. After 1 hour, a solution prepared by dissolving 0.6 g of potassium persulfate in 20 ml of ion-exchanged water was introduced into the three-necked flask. Polymerization was continued for 20 hours while keeping the bath temperature at 70° C. After completion of the polymerization, aggregates were removed with a 200-μm mesh sieve. The average particle diameter of the 2-ethylhexyl methacrylate polymer particles obtained was measured with a laser scattering type particle size distribution analyzer (manufactured by Horiba Ltd.). As a result, the polymer particles were found to be monodisperse particles having a volume average particle diameter of 0.95 μm and a CV of 5.6%. The average molecular weight thereof was determined by gel permeation chromatography and was found to be 27,000. The polymer particle dispersion had a solid concentration of 4.4%.

The subsequent synthesis was conducted in the same manner as in Example 1, except that the seed particle dispersion obtained above was used in an amount of 2.27 g (solid amount, 0.1 g). The particles obtained were monodisperse particles having a number average particle diameter of 7.3 μm and a CV of 6.7%, and pores or the like attributable to seed particle phase separation was not observed thereon.

EXAMPLE 5

A 300 ml three-necked flask was attached to an oil bath. To the flask were introduced 30 g of benzyl methacrylate (special grade reagent) and 1.2 ml or ethylhexyl thioglycolate. After the contents were stirred sufficiently, 200 ml of ion-exchanged water was introduced into the three-necked flask. A condenser tube and a thermometer were attached to the flask. The atmosphere in the three-necked flask was replaced with nitrogen and the oil bath temperature was set at 70° C. to heat the flask. After 1 hour, a solution prepared by dissolving 0.6 g of potassium persulfate in 20 ml of ion-exchanged water was introduced into the three-necked flask. Polymerization was continued for 20 hours while keeping the bath temperature at 70° C. After completion of the polymerization, aggregates were removed with a mesh sieve of 200 μm. The average particle diameter of the benzyl methacrylate polymer particles obtained was measured with a laser scattering type particle size distribution analyzer (manufactured by Horiba Ltd.). As a result, the polymer particles were found to be monodisperse particles having a volume average particle diameter of 0.8 μm and a CV of 5.0%. The average molecular weight thereof was determined by gel permeation chromatography and was found to be 13,000. The polymer particle dispersion had a solid concentration of 11.8%.

The subsequent synthesis was conducted in the same manner as in Example 1, except that the seed particle dispersion obtained above was used in an amount of 3.39 g (solid amount, 0.4 g) and that 30 g of styrene and 20 g of divinylbenzene were used as polymerizable monomers to conduct polymerization without using a pore-forming agent. The particles obtained were monodisperse particles having a number average particle diameter of 4.0 μm and a CV of 7.6%, and pores or the like attributable to seed particle phase separation was not observed thereon.

EXAMPLE 6

Figure 6:
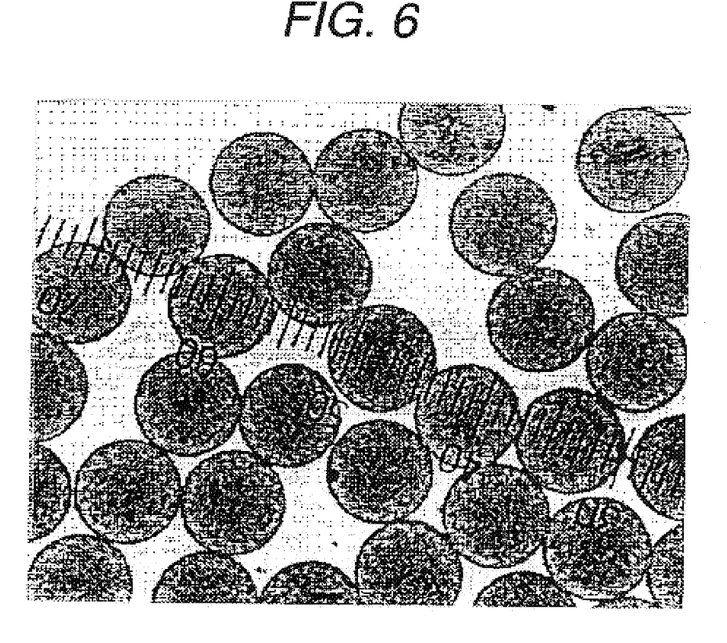
FIG. 6 is an electron photomicrograph showing the particle structure of the particles produced in Example 6. In this figure, each division on the scale corresponds to 2.5 μm.

A 1,000 ml three-necked flask was attached to an oil bath. Thereinto was introduced 0.13 g (solid amount, 0.015 g) of the seed particle dispersion obtained in Example 5, followed by 150 g of a 4% aqueous solution of poly(vinyl alcohol) (Kuraray 224) The contents were stirred at room temperature. On the other hand, 33.0 g of glycidyl methacrylate (special-grade reagent) and 27.0 g of ethylene glycol dimethacrylate (reagent) as polymerizable monomers, 90.0 g of cyclohexanol (special grade reagent) as a pore-forming agent, and 0.6 g of 2,2'-azobis(2,4-dimethylvaleronitrile) (hereinafter referred to as V-65 (manufactured by Wako Pure Chemical Industries, Ltd-)) were introduced into a 500 ml flask and mixed together. Thereto was added 0.7 g of sodium dodecylbenzenesulfonate (reagent), followed by 150 ml of ion-exchanged water. Subsequently, the mixture was emulsified with an ultrasonic homogenizer (manufactured by BRANSON Corp.). This emulsion was added to the seed particle dispersion and the resultant mixture was slowly stirred at room temperature for 3 days. An examination with an optical microscope revealed that the monomer emulsion had been completely absorbed by the seed particles and uniform droplets had generated. The bath temperature was set at 70° C. and polymerization was conducted in a nitrogen stream. The particles obtained were washed with warm water and acetone and then examined with an electron microscope. As a result, the particles were found to be monodisperse particles having a number average particle diameter of 17 μm and a CV of 4.9%, and pores or the like attributable to seed particle phase separation was not observed on the particles. An electron photomicrograph of these particles is shown in FIG. 6.

EXAMPLE 7

Synthesis was conducted in the same manner as in Example 6, except that the amount of the seed particle dispersion produced in Example 4 was changed to 2.72 g (solid amount, 0.32 g) and those of glycidyl methacrylate and ethylene glycol dimethacrylate as polymerizable monomers were changed to 40 g and 18 g, respectively, and that 110 g of 1,2-ethylene dichloride was used as a pore-forming agent and the time period for swelling was changed to one week. The particles obtained were monodisperse particles having a number average particle diameter of 6.3 μm and a CV of 9.7%.

EXAMPLE 8

A 300 ml three-necked flask was attached to an oil bath. Thereinto was introduced 0.51 g (solid amount, 0.06 g) of the seed particle dispersion obtained in Example 5, followed by 10 g of a 4% aqueous solution of poly(vinyl alcohol) (Kuraray 224). The contents were stirred at room temperature. On the other hand, 2.3 ml of ethylhexyl thioglycolate and 0.1 g of sodium dodecylbenzenesulfonate (reagent) were introduced into a 100 ml flask. Thereto was added 10 ml of ion-exchanged water. Subsequently, the mixture was emulsified with an ultrasonic homogenizer (manufactured by BRANSON Corp.). This emulsion was added to the seed particle dispersion and the resultant mixture was slowly stirred at room temperature for one week. An examination with an optical microscope revealed that the chain transfer agent emulsion had been completely absorbed by the seed particles. Into a 300 ml flask were introduced 50 g of benzyl methacrylate, 0.6 g of V-65, and 0.3 g of sodium dodecylbenzenesulfonate, followed by 50 ml of ion-exchanged water. Subsequently, the mixture was emulsified with an ultrasonic homogenizer (manufactured by BRANSON Corp.). This emulsion was added to the seed particle dispersion and the resulting mixture was slowly stirred at room temperature for 16 hours. An examination with an optical microscope revealed that the monomer emulsion had been completely absorbed by the seed particles.

Figure 7:
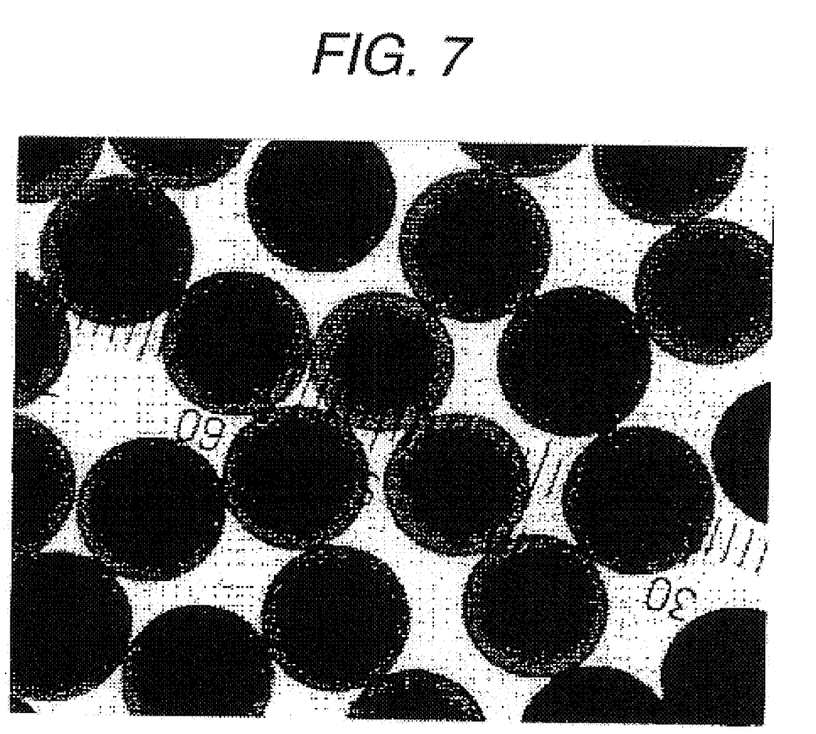
FIG. 7 is an electron photomicrograph showing the particle structure of the particles produced in Example 8. In this figure, each division on the scale corresponds to 5 μm.

The bath temperature was set at 70° C. and polymerization was conducted in a nitrogen stream. Synthesis was conducted in the same manner as in Example 6, except that the particle dispersion obtained was used as a seed particle dispersion in an amount of 2.8 g in terms of a solid content. The particles obtained were examined with an optical microscope. As a result, the particles were found to be monodisperse particles having a number average particle diameter of 40 μm and a CV of 7.9%. A photograph of these particles taken with the optical microscope is shown in FIG. 7.

COMPARATIVE EXAMPLE 1

A 300 ml three-necked flask was attached to an oil bath. To the flask were introduced 30 g of styrene (special grade reagent) and 0.6 ml of ethylhexyl thioglycolate. After the contents were stirred sufficiently, 200 ml of ion-exchanged water was introduced into the three-necked flask. A condenser tube and a thermometer were attached to the flask. The atmosphere in the three-necked flask was replaced with nitrogen and the oil bath temperature was set at 70° C. to heat the flask. After 1 hour, a solution prepared by dissolving 0.6 g of potassium persulfate in 20 ml of ion-exchanged water was introduced into the three-necked flask. Polymerization was continued for 20 hours while keeping the bath temperature at 70° C. After completion of the polymerization, aggregates were removed with a mesh sieve of 200 μm. The polystyrene particles obtained were found to be monodisperse particles having a volume-average particle diameter of 1.1 μm and a CV of 4.9%. The average molecular weight thereof was 48,000. The polymer particle dispersion had a solid concentration of 15.0%.

Figure 4:
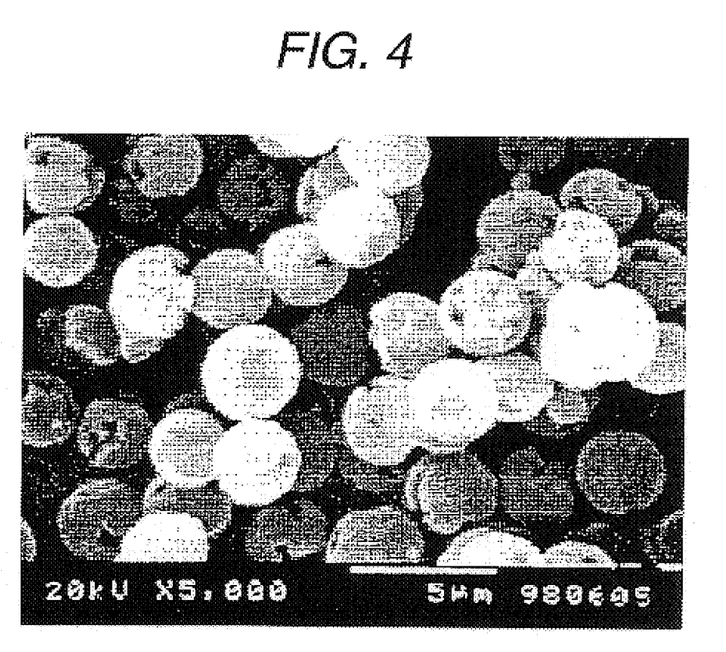
FIG. 4 is an electron photomicrograph showing the particle structure of the particles produced in Comparative Example 1.

A 500 ml three-necked flask was attached to an oil bath. Synthesis was conducted in the same manner as in Example 1, except that 11.1 g (solid amount, 1.67 g) of the seed particle dispersion obtained above was used. The particles obtained were washed with warm water and acetone and then examined with an electron microscope. As a result, the particles were found to be monodisperse particles having a nu number average particle diameter of 3.2 μm and a CV of 7.8%. However, these particles had pores attributable to the seed particles. An electron photomicrograph of these particles is shown in FIG. 4.

COMPARATIVE EXAMPLE 2

Synthesis was conducted in the same manner as in Example 1, except that 3.3 g (solid amount, 0.5 g) of the seed particle dispersion produced in Comparative Example 1 was used. The particles obtained were washed with warm water and acetone and then examined with an electron microscope. As a result, the particles were found to contain many large particles other than the target particles and further contain many fine particles.

COMPARATIVE EXAMPLE 3

Figure 5:
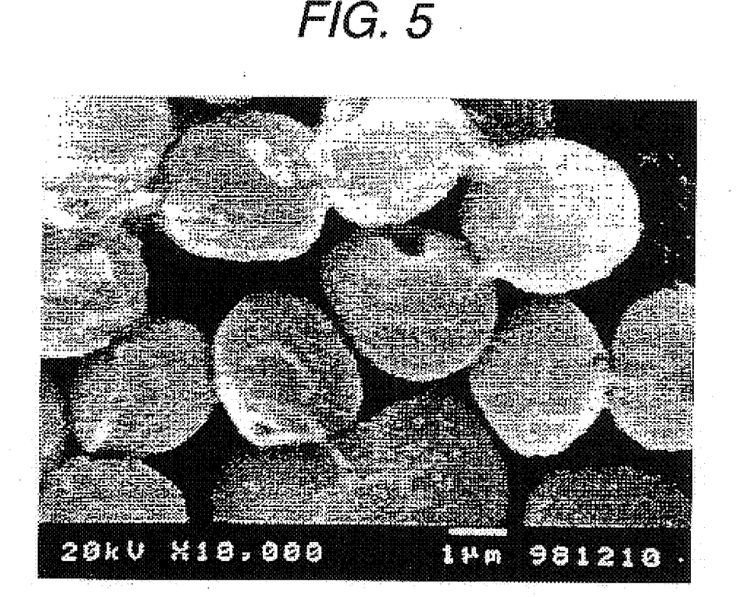
FIG. 5 is an electron photomicrograph showing the particle structure of the particles produced in Comparative Example 3.

Synthesis was conducted in the same manner as in Example 2, except that 6.6 g (solid amount, 1.0 g) of the seed particle dispersion produced in Comparative Example 1 was used. The particles obtained were washed with warm water and acetone and then examined with an electron microscope. As a result, the particles were found to have a number average particle diameter of 3.2 μm. However, they were non-spherical particles which had pores attributable to the seed particles and a large proportion of which were coarse particles formed through droplet coalescence. An electron photomicrograph of these particles is shown in FIG. 5.

As described above, monodisperse particles having a particle diameter in the range of about from 1 to 1,000 μm can be produced exceedingly easily according to the invention as compared with conventional techniques. When the monodisperse particles, which are uniform in particle diameter, are packed as a packing into a column for liquid chromatography and this column is used in liquid chromatography, then various effects can be attained, such as, e.g., a reduction in measuring pressure, an improvement in peak shape for test samples, and an improvement in separative performance.

What is claimed is:

1. The process for producing monodisperse particles which comprises:
    a) a step of mixing a polymerizable monomer, an oil-soluble polymerization initiator, a non-aqueous organic solvent and water to form an aqueous emulsion;

b) a step of adding an aqueous dispersion of monodisperse polymer seed particles to the aqueous emulsion obtained in step a) to thereby swell the polymer seed particles; and c) a step of polymerizing the polymerizable monomers in the swollen polymer seed particles, wherein d) the polymer seed particles are monodisperse polymer seed particles having a weight average molecular weight of 50,000 or lower, consisting of a poly(meth)acrylic ester) containing at least one substituent selected from the group consisting of straight-chain alkyl groups having 6 or more carbon atoms, alicyclic alkyl groups having 6 or more carbon atoms, phenyl groups, benzyl groups and halogenated alkyl groups having 3 or more carbon atoms;

e) the monodisperse particles obtained in the polymerization step c) are formed such that polymer seed particles and the polymer obtained by polymerizing the polymerizable monomers do not cause phase separation;

f) the amount of the polymerizable monomer and the non-aqueous organic solvent is 10 to 50,000 times by volume the volume of the polymer seed particles;

g) the non-aqueous organic solvent is a halogenated compound; and (h) the non-aqueous organic solvent is added in an amount of 102 to 200 parts by weight per 100 parts by weight of the polymerizable monomer.

2. The process for producing monodisperse particles of claim 1, wherein the halogenated compounds are selected from the group consisting of ethylene dichloride, 1,3-dichloropropane, benzene chloride and chloroform.

3. A process for producing monodisperse particles which comprises:

a) a step of mixing a polymerizable monomer, an oil-soluble polymerization initiator, a non-aqueous organic solvent and water to form an aqueous emulsion;

b) a step of adding an aqueous dispersion of monodisperse polymer seed particles to the aqueous emulsion obtained in step a) to thereby swell the polymer seed particles; and c) a step of polymerizing the polymerizable monomers in the swollen polymer seed particles, wherein d) the polymer seed particles are monodisperse seed particles having a weight average molecular weight of 50,000 or lower, consisting of a poly(meth)acrylic ester) containing at least one substituent selected from the group consisting of straight-chain alkyl groups having 6 or more carbon atoms, alicyclic alkyl groups having 6 or more carbon atoms, phenyl groups, benzyl groups and halogenated alkyl groups having 3 or more carbon atoms;

e) the monodisperse particles obtained in the polymerization step c) are formed such that the polymer seed particles and the polymer obtained by polymerizing the polymerizable monomers do not cause phase separation;

f) the amount of the polymerizable monomer and the non-aqueous organic solvent is 10 to 50,000 times by volume of the polymer seed particles;

g) the non-aqueous organic solvent is a higher alcohol selected from the group consisting of butanol, pentanol and hexanol; and h) the non-aqueous organic solvent is added in an amount of 102 to 200 parts by weight per 100 parts by weight of the polymerizable monomer.

4. The process for producing monodisperse particles of claim 3, wherein the higher alcohols are hexanol.

* * * * *